United States Patent [19]
Wisenbaugh

[11] Patent Number: 5,289,940
[45] Date of Patent: Mar. 1, 1994

[54] ROTARY FISHING LURE CONTAINER

[76] Inventor: David H. Wisenbaugh, 3821 N-M-52, Owosso, Mich. 48867

[21] Appl. No.: 933,767

[22] Filed: Aug. 24, 1992

[51] Int. Cl.⁵ ............................................. A01K 97/06
[52] U.S. Cl. .................................... 220/507; 220/524; 220/552; 220/553; 220/503; 220/504; 220/478; 220/481; 206/315.11; 206/315.1; 248/130; 43/57.1; 43/54.1; 43/55
[58] Field of Search ............ 206/315.11, 315.1; 43/57.1, 54.1, 55; 248/130; 220/478, 481, 507, 524, 553, 552, 523, 503, 504

[56] References Cited

U.S. PATENT DOCUMENTS

| | | | |
|---|---|---|---|
| 2,436,109 | 2/1948 | Kollman | 43/55 |
| 2,665,517 | 1/1954 | Archer | 43/57.1 |
| 2,814,152 | 11/1957 | Trujillo | 43/571 |
| 2,987,846 | 6/1961 | Powell | 43/57.1 |

Primary Examiner—Allan N. Shoap
Assistant Examiner—Paul A. Schwarz
Attorney, Agent, or Firm—Leon Gilden

[57] ABSTRACT

A container is arranged with a central core support, with the core support having radially displaced vanes fixedly mounted relative to a central spine, wherein each vane fixedly mounts a floor and array of divider walls. The core support is mounted between front and rear walls, with the rear wall hingedly mounting a lid over each array of divider walls.

7 Claims, 4 Drawing Sheets

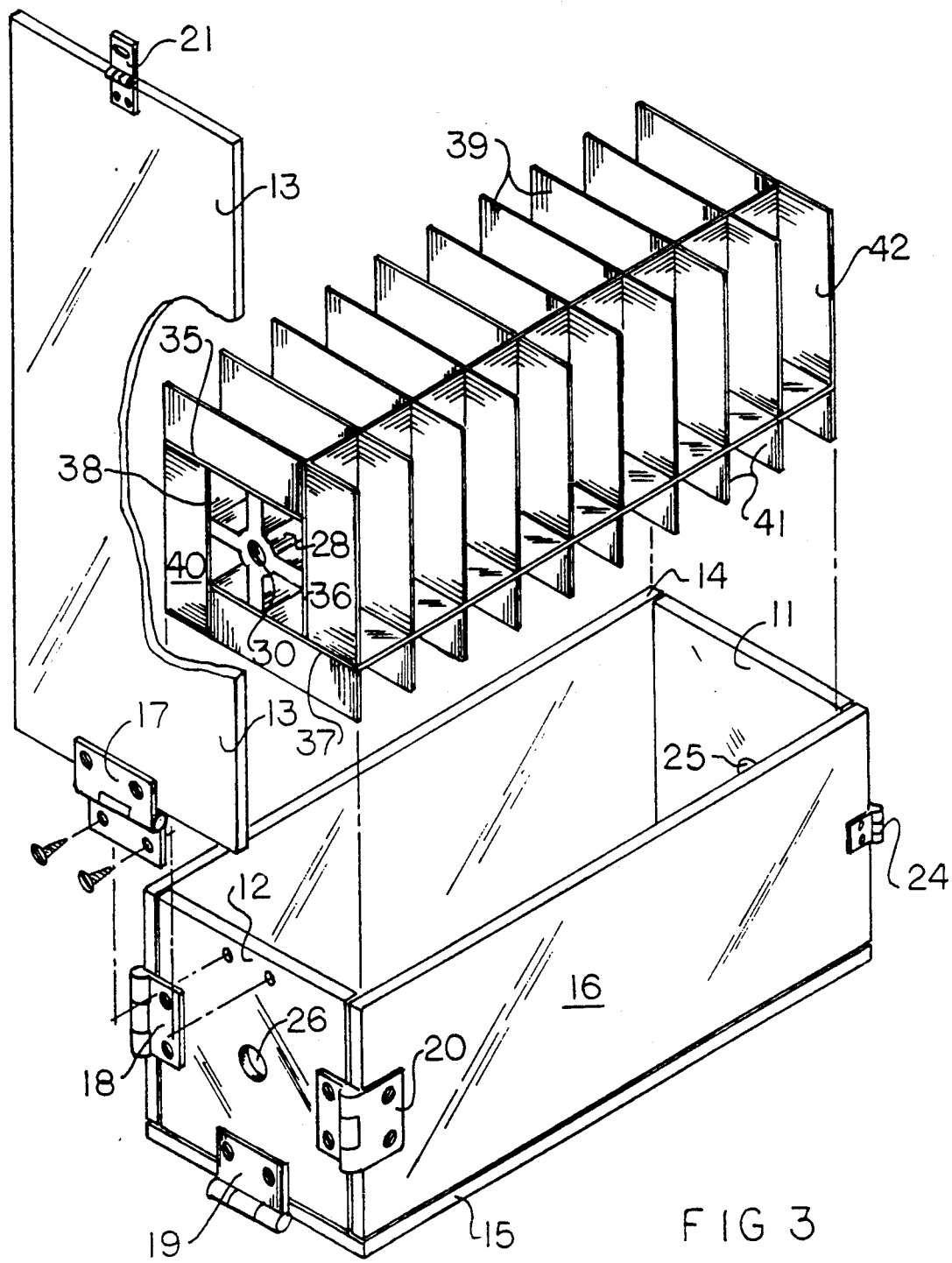

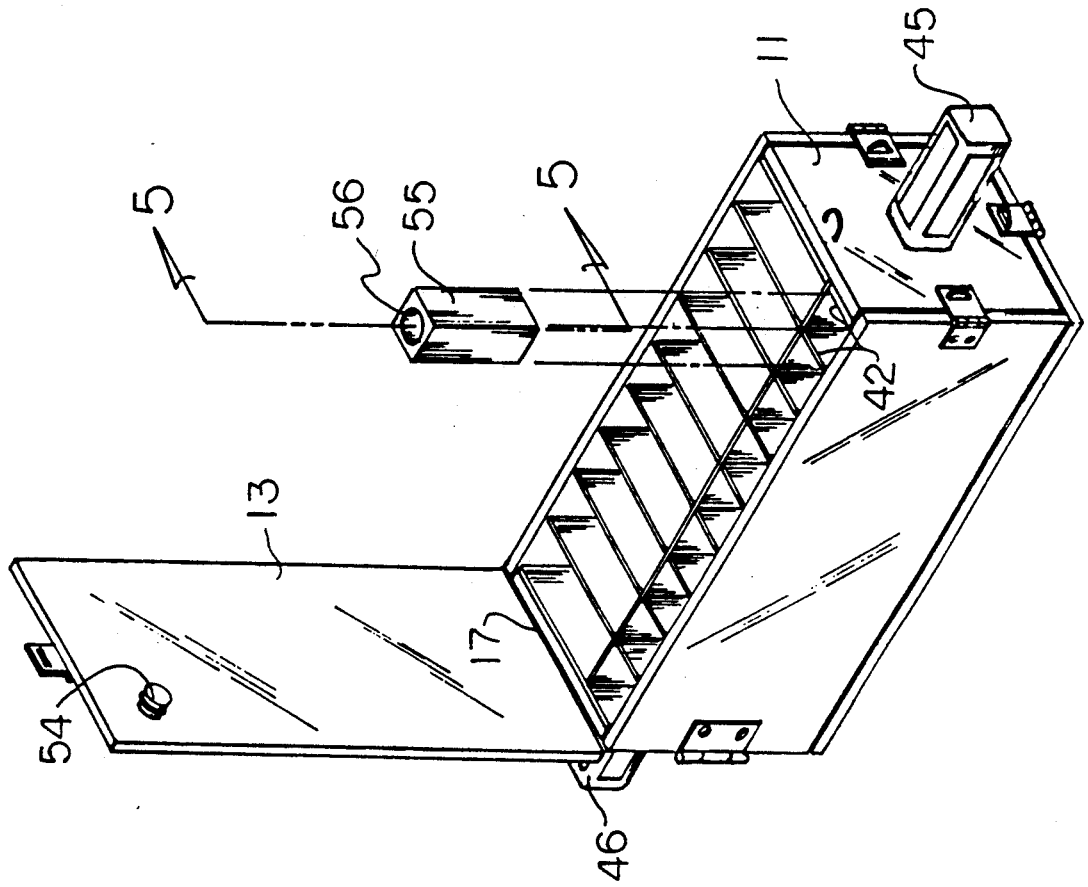

ROTARY FISHING LURE CONTAINER

BACKGROUND OF THE INVENTION

1. Field of the Invention

The field of invention relates to fishing lure support structure, and more particularly pertains to a new and improved rotary fishing lure container wherein the same is arranged for rotatably positioning selective rows of fishing lures.

2. Description of the Prior Art

Fishing lure support containers and holders of various types have been utilized throughout the prior art for the convenient mounting and maintenance of the fishing lure structure. Such enclosures of various types have been presented in the prior art patents to include U.S. Pat. Nos. 4,653,220; 4,958,730; 4,073,085; and 4,972,625.

The prior art has typically positioned fishing lure wherein access to individual lures when a great quantity of lures is stored is rendered more difficult, wherein the instant invention attempts to position all fishing lures for ease of access relative to an associated door structure and in this respect, the present invention substantially fulfills this need.

SUMMARY OF THE INVENTION

In view of the foregoing disadvantages inherent in the known types of fishing lure container structure now present in the prior art, the present invention provides a rotary fishing lure container wherein the same is arranged for rotatably addressing various portions of a container for access thereto. As such, the general purpose of the present invention, which will be described subsequently in greater detail, is to provide a new and improved rotary fishing lure container which has all the advantages of the prior art fishing lure container structure and none of the disadvantages.

To attain this, the present invention provides a container arranged with a central core support, with the core support having radially displaced vanes fixedly mounted relative to a central spine, wherein each vane fixedly mounts a floor and array of divider walls. The core support is mounted between front and rear walls, with the rear wall hingedly mounting a lid over each array of divider walls.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved rotary fishing lure container which has all the advantages of the prior art fishing lure containers and none of the disadvantages.

It is another object of the present invention to provide a new and improved rotary fishing lure container which may be easily and efficiently manufactured and marketed.

It is a further object of the present invention to provide a new and improved rotary fishing lure container which is of a durable and reliable construction.

An even further object of the present invention is to provide a new and improved rotary fishing lure container which is susceptible of a low cost of manufacture with regard to both materials and labor, and which accordingly is then susceptible of low prices of sale to the consuming public, thereby making such rotary fishing lure containers economically available to the buying public.

Still yet another object of the present invention is to provide a new and improved rotary fishing lure container which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric rear view of the invention with the core support and divider wall structure separated from the enclosure structure.

FIG. 4 is an isometric illustration of the invention mounting a fish scent container.

FIG. 5 is an orthographic view, taken along the lines 5—5 of FIG. 4 in the direction indicated by the arrows.

DESCRIPTION OF THE PREFERRED EMBODIMENT

Figure 1:
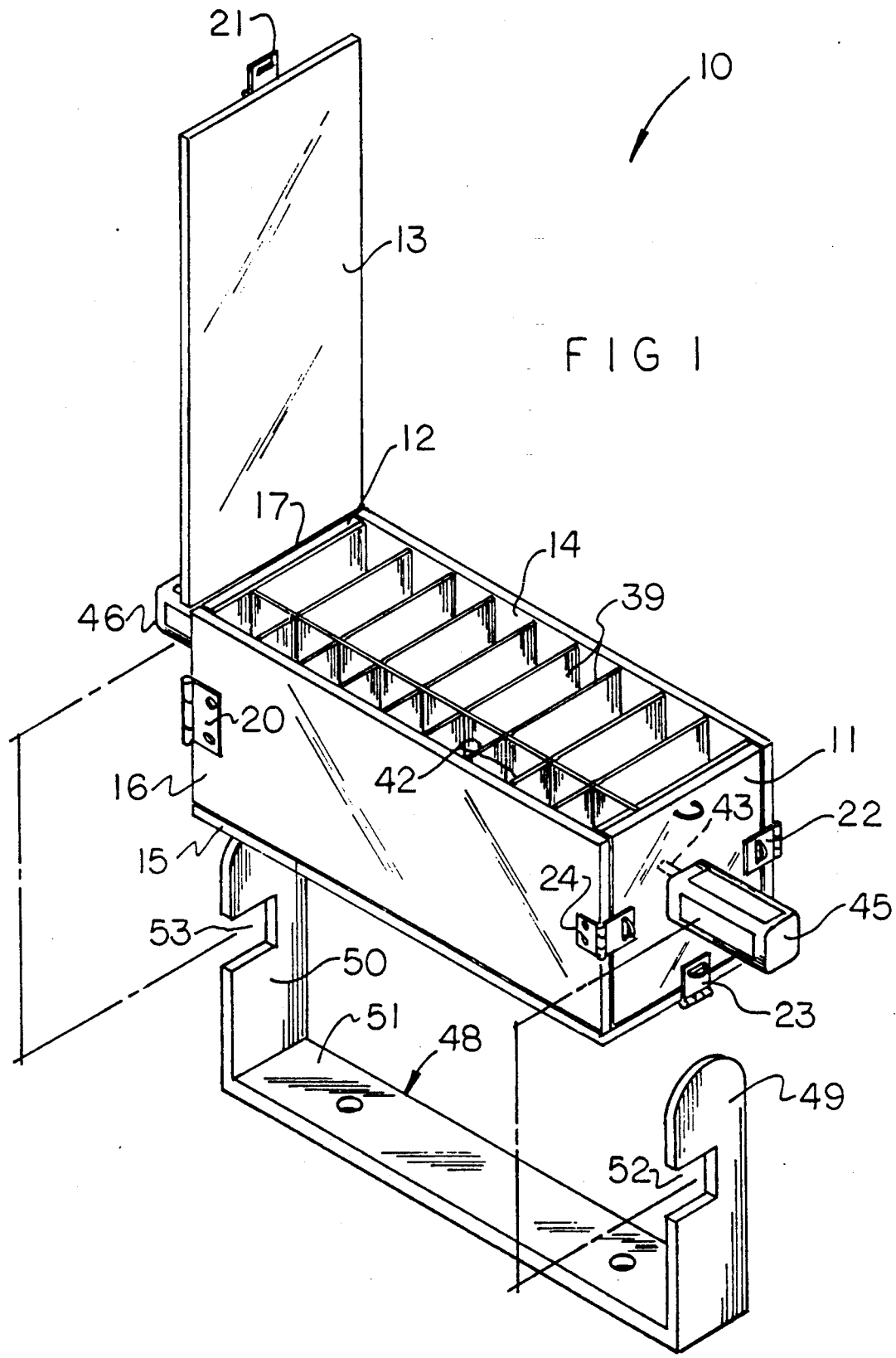
FIG. 1 is an isometric illustration of the invention.
Figure 2:
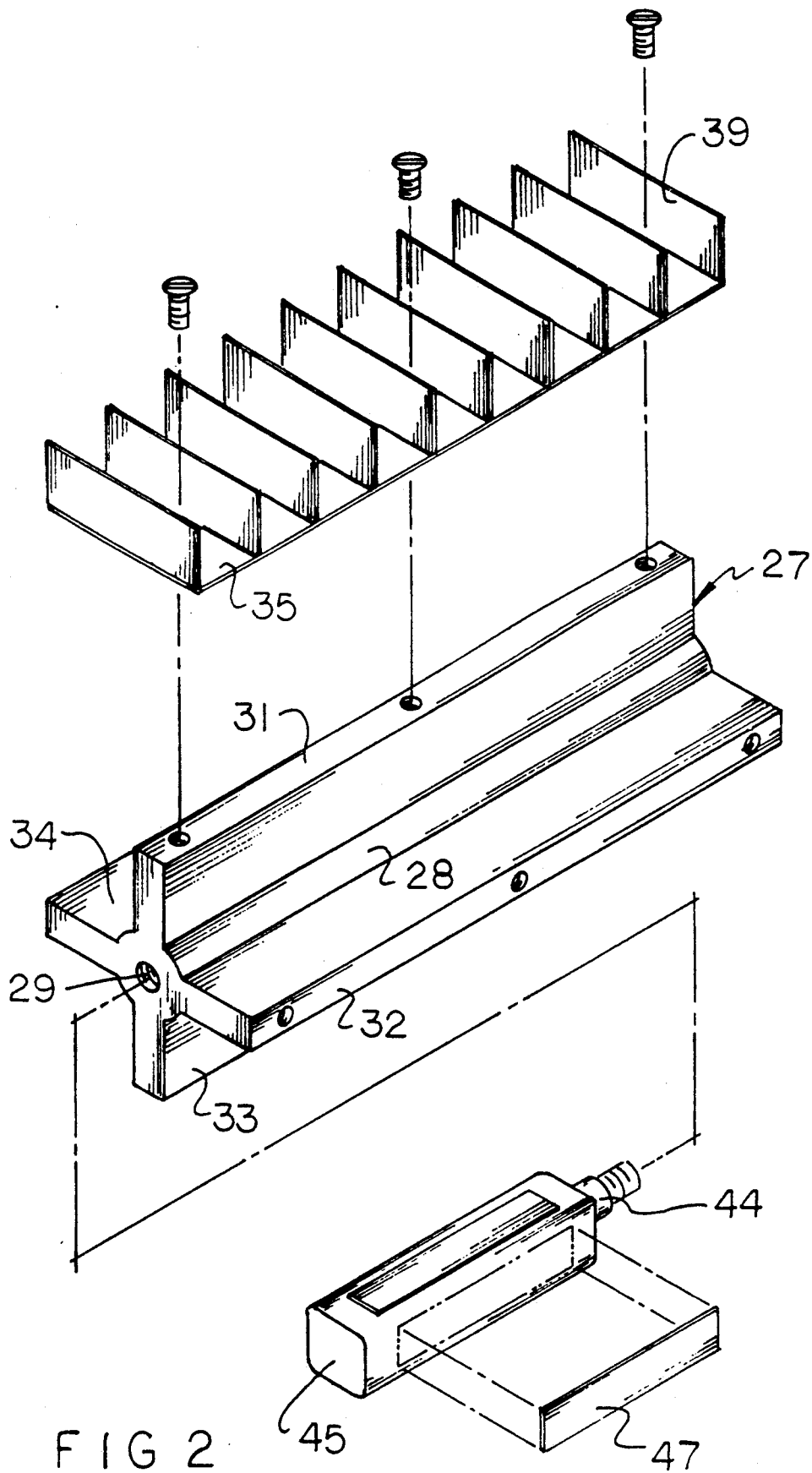
FIG. 2 is an isometric exploded view of the core support structure of the invention.

With reference now to the drawings, and in particular to FIGS. 1 to 5 thereof, a new and improved rotary fishing lure container embodying the principles and concepts of the present invention and generally designated by the reference numeral 10 will be described.

More specifically, the rotary fishing lure container 10 of the instant invention essentially comprises a front wall 11 spaced from, parallel to, and coextensive with a rear wall 12. The front and rear walls are typically of a square configuration of a predetermined width. The construction of the front wall and the rear wall is defined with a front wall first, second, third, and fourth respective side edge and the rear wall having a respective rear wall first, second, third, and fourth side edge. Respective first, second, third, and fourth lids 13, 14, 15, and 16 respectively are hingedly mounted to the rear wall 12 about a respective first, second, third, and fourth hinge 17, 18, 19, and 20 (see FIG. 3). The respective first through fourth lids include respective first, second, third, and fourth latches 21, 22, 23, and 24 respectively that are arranged for securement to the front wall 11. The front wall 11 includes a front wall bore 25 medially thereof, with the rear wall 12 having a rear wall bore 26 medially thereof, with the front and rear wall bores 25 and 26 coaxially aligned relative to one another.

An elongate core support 27 (see FIG. 2) is provided and extends orthogonally and coextensively between the front and rear walls 11 and 12. The core support 27 is formed with a central rigid spine 18 coaxially aligned, with the front and rear wall bores 25 and 26 having respective first and second bores 29 and 30 mounted at opposed distal ends of the rigid spine 28, with the first bore 29 coaxially aligned with and adjacent the front wall bore 25 and the second bore 30 coaxially aligned with and adjacent the rear wall bore 26. A plurality of radial vanes, including a first, second, third, and fourth radial vane 31, 32, 33, and 34 are spaced apart in an orthogonal relationship relative to adjacent vanes, with the radial vanes arranged coextensive with the spine 28. The radial vanes are radially directed into the spine 28 and the respective first through fourth vanes. A first, second, third, and fourth floor plate 35, 36, 37, and 38 respectively are orthogonally mounted to the first, second, third, and fourth radial vanes respectively. The first floor plate 35 includes respective parallel first side edges. The second floor plate 36 includes respective parallel second side edges, the third floor plate 37 includes respective third side edges, and the fourth floor plate 38 includes respective parallel fourth side edges. The first floor plate 35 orthogonally intersects the second floor plate 36 intermediate the second side edges, the second floor plate 36 orthogonally intersects the third floor plate intermediate the third floor plate parallel third side edges, the fourth floor plate orthogonally intersects the first floor plate intermediate the first floor plate parallel first side edges, in a manner as illustrated in FIG. 3. The first through fourth floor plates 35-38 include a respective parallel array of respective first, second, third, and fourth divider walls 39, 40, 41, and 42 respectively, as illustrated in FIG. 3. The divider walls 39 are each of a predetermined length and of a predetermined height, wherein the predetermined length and a predetermined height when added cumulatively are substantially equal to a predetermined width of the walls 11 and 12. In this manner, the floor plates and the divider walls overlap each other when positioned below an associated lid, in a manner as illustrated in FIG. 1 for example.

A first axle 43 is directed into the first bore 29 through the front wall 11, with a second axle 44 similarly directed through the rear wall 12 into the rear wall bore 26. Respective first and second handles 45 and 46 are coaxially aligned with and mounted to the respective first and second axles 43 and 44. The handles are of a square cross-sectional configuration and may include indicator plates 47 mounted thereon in any manner, such as adhesives, mechanical, or magnetic fastening for providing for labeling of the divider walls associated with each of the indicator plates 47 of the handles.

A support bracket 48 is provided of a generally U-shaped configuration having a base web 51 and spaced parallel first and second legs 49 and 50. The first and second legs 49 and 50 include respective first and second leg recesses 52 and 53 to receive complementarily and fixedly the respective first and second axle handles 45 and 46. The recesses are spaced above the base web 51 a predetermined spacing substantially greater than one-half of the predetermined width of the front walls 11 and 12 to permit rotation of the enclosure structure above the base web 51.

The FIGS. 4 and 5 indicate the use of a container 55 having a fluid fish scent 57 contained therewithin accessed through a container bore 56. The container bore, as well as the container 55, are mounted between a plurality of the first divider walls 39 a predetermined radial length relative the first hinge 17. A container plug seal 54 mounted to a bottom surface of the first lid 13 is spaced from the first hinge 17 the predetermined radial length for complementary reception into the container opening bore 56 when the first lid 13 is arranged in secured orientation to the front wall 11 for providing for sealing and selective access to the container 55 and its contents upon opening of the lid 13.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing lure container, comprising,
a front wall spaced from a rear wall in a parallel and coextensive relationship relative to one another, the front wall and rear wall are each of a generally square configuration, and
including a front wall first side edge, a front wall second side edge, a front wall third side edge, and a front wall fourth side edge, with the rear wall including a rear wall first side edge, a rear wall second side edge, a rear wall third side edge, and a rear wall fourth side edge, and a first lid having a first hinge hingedly mounting adjacent to the rear wall first side edge, a second lid having a second hinge hingedly mounted to the rear wall second side edge, a third lid having a third hinge hingedly mounted to the rear wall third side edge, and a fourth lid having a fourth hinge hingedly mounted to the rear wall fourth side edge, the first lid having a first latch means for securement adjacent to the front wall first side edge, the second lid having a second latch means for securement to the front wall second side edge, the third lid having a third latch means for securement to the front wall third side edge, and the fourth lid having a fourth latch means for securement to the front wall fourth side edge, and a core support extending coextensively between the front wall and rear wall medially of the front wall and rear wall and orthogonally oriented relative to the front wall and rear wall, wherein the core support includes a central rigid spine, wherein the central rigid spine is oriented medially of the front wall and rear wall and orthogonally oriented relative to the front wall and rear wall, and the central rigid spine includes first radial vane, a second radial vane, a third radial vane, and a fourth radial vane, each vane is spaced ninety degrees relative to one another, wherein the first radial vane is orthogonally oriented relative to the first lid, the second radial vane is orthogonally oriented relative to the second lid, the third radial vane is orthogonally oriented relative to the third lid, and the fourth radial vane is orthogonally oriented relative to the fourth lid, and a first floor plate orthogonally and integrally mounted to the first radial vane, a second floor plate integrally and orthogonally mounted to the second radial vane, a third floor plate integrally and orthogonally mounted to the third radial vane, and a fourth plate integrally and orthogonally mounted to the fourth radial vane.

2. A container as set forth in claim 1 wherein the first floor plate includes parallel first side edges, the second floor plate includes parallel second side edges, the third floor plate includes parallel third side edges, and the fourth floor plate includes parallel fourth side edges, wherein the first floor plate orthogonally intersects the second floor plate intermediate the second side edges, the second floor plate orthogonally intersects the third floor plate intermediate the third side edges, the third floor plate orthogonally intersects the fourth floor plate intermediate the fourth side edges, and the fourth floor plate orthogonally intersects the first plate intermediate the first side edges.

3. A container as set forth in claim 2 wherein the first floor plate includes a row of parallel spaced first divider walls, the second floor plate includes a row of parallel and spaced second divider walls, the third floor plate includes a row of parallel and spaced third divider walls, and the fourth floor plate includes a row of parallel and spaced fourth divider walls, wherein each of the divider walls are oriented parallel to and intermediate the front wall and the rear wall.

4. A container as set forth in claim 3 wherein the divider walls are each of a predetermined length and each of a predetermined height, wherein the predetermined length plus the predetermined height is substantially equal to a predetermined width of the front wall and the rear wall.

5. A container as set forth in claim 4 wherein the front wall includes a front wall bore, the rear wall includes a rear wall bore, wherein the front wall bore and the rear wall bore are coaxially aligned and oriented medially of the front wall and rear wall respectively, with the rigid spine having a first bore coaxially aligned with and adjacent the front wall bore, and a second bore coaxially aligned with and adjacent the rear wall bore, and a first axle directed into the front wall and into the first bore, a second axle directed into the rear wall bore and into the second bore, with the first axle having an axle handle extending orthogonally and exteriorly of the front wall, and the second axle having a second handle extending orthogonally and exteriorly of the rear wall.

6. A container as set forth in claim 5 including a U-shaped support bracket, the support bracket having a first leg, a second leg parallel to the first leg, and a base extending orthogonally and between the first leg and the second leg, and the first leg includes a first leg recess for receiving the first handle, the second leg having a second leg recess for receiving the second handle, wherein the first leg recess and the second leg recess are spaced above the base web a predetermined spacing substantially greater than one-half of the predetermined width to permit rotation of the container between the first leg and the second leg above the base web.

7. A container as set forth in claim 6 wherein the first side includes a container plug seal, the container plug seal spaced from the first hinge a predetermined radial length, and a fluid container, the fluid container including a fluid fish scent therewithin having an opening bore, with the opening bore spaced from the first hinge said predetermined radial length, and the container is positioned between a plurality of fourth divider walls.

* * * * *